United States Patent
K N et al.

(10) Patent No.: US 11,336,570 B1
(45) Date of Patent: May 17, 2022

(54) LAYER THREE MULTI-HOMING FOR VIRTUAL NETWORKS

(71) Applicant: Juniper Networks, Inc., Sunnyvale, CA (US)

(72) Inventors: Kiran K N, Bangalore (IN); Sangarshan Pillareddy, Bangalore (IN); Ganesha Hebbale Venkatasubbaiah, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/196,514

(22) Filed: Mar. 9, 2021

(51) Int. Cl.
*H04L 12/721* (2013.01)
*H04L 12/26* (2006.01)
*G06F 9/455* (2018.01)
*H04L 45/586* (2022.01)
*H04L 45/00* (2022.01)
*H04L 12/46* (2006.01)
*H04L 45/24* (2022.01)
*H04L 47/125* (2022.01)
*H04L 45/42* (2022.01)

(52) U.S. Cl.
CPC ........ *H04L 45/586* (2013.01); *H04L 12/4633* (2013.01); *H04L 45/24* (2013.01); *H04L 45/42* (2013.01); *H04L 45/566* (2013.01); *H04L 47/125* (2013.01)

(58) Field of Classification Search
CPC ....... H04L 45/586; H04L 45/24; H04L 45/42; H04L 45/566; H04L 47/125; H04L 12/4633
USPC ...................................................... 709/238
See application file for complete search history.

(56) References Cited

U.S. PATENT DOCUMENTS 7,184,437 B1 2/2007 Cole et al.
9,641,435 B1 * 5/2017 Sivaramakrishnan ....................... H04L 69/166

(Continued)

FOREIGN PATENT DOCUMENTS

WO 2013184846 A1 12/2013
WO WO-2019229760 A1 * 12/2019 ............. H04L 45/64

OTHER PUBLICATIONS

Hopps, "Analysis of an Equal-Cost Multi-Path Algorithm," RFC 2992, Network Working Group, Nov. 2000, 8 pp.

(Continued)

*Primary Examiner* — Ruolei Zong
(74) *Attorney, Agent, or Firm* — Shumaker & Sieffert, P.A.

(57) ABSTRACT

A network system includes a server comprising a set of virtual routers configured to extend virtual networks to virtual machines. A virtual router of the set of virtual routers may receive a tunnel packet comprising a outer header and an inner packet that defines a first packet flow, and determine, based at least on the outer header, that the tunnel packet is associated with a first virtual network of the virtual networks. The virtual router may also associate, based on the inner packet, the tunnel packet to a layer three link of a plurality of layer three links coupling the virtual router to two or more top-of-rack switches in the virtual network, where the plurality of layer three links form a layer three multi-homing connection between the virtual router and the top-of-rack switches in the virtual network. The virtual router may transmit the tunnel packet via the layer three link.

20 Claims, 6 Drawing Sheets

(56) References Cited

U.S. PATENT DOCUMENTS

| | | | | |
|---|---|---|---|---|
| 2013/0332602 A1* | 12/2013 | Nakil | ............... | G06F 11/008 709/224 |
| 2014/0098815 A1* | 4/2014 | Mishra | ............... | H04L 45/021 370/390 |
| 2015/0244617 A1* | 8/2015 | Nakil | ............... | H04L 41/0631 709/224 |
| 2017/0317919 A1* | 11/2017 | Fernando | ............... | H04L 61/103 |
| 2018/0359171 A1* | 12/2018 | Kommula | ............... | H04L 45/02 |
| 2019/0104438 A1* | 4/2019 | Mittal | ............... | H04W 40/24 |

OTHER PUBLICATIONS

"L3 Multihoming Blueprint" tunstenfabric/tf-specs, uploaded to Github on Nov. 2, 2020, and accessible via online address https://github.com/tungstenfabric/tf-specs/commit/6db4d1078fb5f15275a1881c3ad96743b9de9fa5?short_path=af8efa2 (last accessed Mar. 9, 2021), 12 pp.

"Reference Architecture for Contrail Cloud 13.1 and 13.2" Release 13.1 and 13.2, Tech-Library, Contrail Cloud, Juniper Networks, Inc., Sep. 2, 2020, 114 pp.

\* cited by examiner

LAYER THREE MULTI-HOMING FOR VIRTUAL NETWORKS

TECHNICAL FIELD

Techniques of this disclosure relate generally to computer networks and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities.

SUMMARY

In general, techniques are described for enhancing operations of virtual networks. For example, a virtual network controller is described that configures and manages an overlay network within a physical network formed by a plurality of switches. A plurality of servers is interconnected by the switch fabric, and each of the servers provides an operating environment executing one or more virtual machines in communication via the overlay networks. A set of virtual routers operating within the servers and/or other devices of the physical network extends the overlay network as a virtual network to the operating environment of the virtual machines. The controller may instruct the servers and the virtual routers to perform various operations, such as forwarding traffic through the overlay networks; re-routing traffic in the virtual networks due to network events; replicating traffic for multicasting, networking services including security, NAT, mirroring, and load balancing; providing multi-tenant services to support multiple virtual networks; monitoring and logging traffic characteristics within the virtual networks; and other operations.

The techniques described herein may be utilized to enhance, for example, operation of the virtual routers or other devices that provide virtual networks. In general, a virtual router for a virtual network executes multiple routing instances for corresponding virtual networks. Each virtual network interconnects multiple virtual routers collectively implementing the virtual network. Packets received by the virtual router from the underlying physical network fabric may include an outer header to allow the physical network fabric to tunnel the payload or "inner packet" to a physical network address for a network interface of the server that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In one example of enhancing the operation of the virtual routers, a virtual router may, as described herein, establish a layer three (L3) multi-homing connection between the virtual router and two or more of the plurality of switches (which may be referred to as "top-of-the-rack switches") that facilitate packet delivery via the virtual networks. Rather than utilize a layer two (L2) link aggregation protocol (such as a so-called "multi-chassis link aggregation group protocols," which may be denoted as "MC-LAG," or variations thereof) that may require a particular vendor-specific link aggregation group (LAG) implementation and complex administrative and configuration operations, the virtual routers may establish the L3 multi-homing connection utilizing existing L3 protocols that are generally supported by most, if not all, top-of-rack switches.

In addition to avoiding using L2 link aggregation group (L2 LAG) protocols, the virtual router may perform load balancing across multiple links forming the L3 multi-homing connection similar to MC-LAG but utilizing information in the packets that would otherwise be unavailable to the servers supporting execution of the virtual router. That is, in an MC-LAG-based load balancing implementation, servers maintain the MC-LAG abstraction that presents the multiple links in the LAG as a single link to the virtual router (meaning, for example, that the virtual router configures the LAG as a single link in the routing table for the corresponding virtual network). The servers then perform load balancing outside of the context of the virtual router using the above noted "outer header" without access to the payload or any other information in the packets output by the virtual router. According to techniques described herein, the virtual router itself performs the load balancing based on either the outer header, an inner header of the packet (which may refer to the "inner packet" noted above), or both the outer header and the inner header of the packet. By increasing the available information for performing load balancing, the virtual router may increase entropy that results in better distribution (or, in other words, balancing) of traffic via the two or more links in the L3 multi-homing connection.

In this respect, various aspects of the techniques may facilitate more efficient utilization of the underlying virtual network while also reducing consumption of resources of the virtual router (or the servers supporting execution of the virtual router). In other words, improving load balancing may reduce retransmission of packets (due to conflicts when sending packets via oversubscribed links) and may decrease operations associated with such retransmissions (e.g., memory bandwidth, memory storage space, processing cycles, energy consumption, etc.). Moreover, in improving load balancing without requiring proprietary LAG protocols, the techniques may enable better operation of virtual networks that enable inter-manufacturer compatibility while also promoting load balancing across multiple links so as to provide high availability, redundancy, higher bandwidth throughput, and the like. The techniques may also reduce operational expenditures associated with configuring MC-LAG on switches and the servers.

In one example, various aspects of the techniques described in this disclosure are directed to a method comprising: receiving, by a virtual router of a computing device for one or more virtual networks, a first tunnel packet comprising a first outer header and a first inner packet that defines a first packet flow; determining, based at least on the first outer header, that the first tunnel packet is associated with a first virtual network of the one or more virtual networks; associating, based on the first inner packet, the first tunnel packet to a first layer three link of a plurality of layer three links coupling the virtual router to two or more top-of-rack switches in the first virtual network, wherein the plurality of layer three links form a layer three multi-homing connection between the virtual router and the two or more top-of-rack switches in the first virtual network; and transmitting, based on associating the first tunnel packet to the first layer three link, the first tunnel packet via the first layer three link of the plurality of layer three links.

In another example, various aspects of the techniques described in this disclosure are directed to a network system comprising: a switch fabric comprising a plurality of switches interconnected to form a physical network; a virtual network controller configured to configure and manage virtual networks within the physical network; and a plurality of servers interconnected by the switch fabric, wherein each of the servers comprises an operating environment configured to execute one or more virtual machines in communication via the virtual networks, and wherein the servers comprise a set of virtual routers configured to extend the virtual networks to the virtual machines, wherein a virtual router of the set of virtual routers is configured to: receive a first tunnel packet comprising a first outer header and a first inner packet that defines a first packet flow; determine, based at least on the first outer header, that the first tunnel packet is associated with a first virtual network of the one or more virtual networks; associate, based on the inner packet, the first tunnel packet to a first layer three link of a plurality of layer three links coupling the virtual router to two or more top-of-rack switches in the first virtual network, wherein the plurality of layer three links form a layer three multi-homing connection between the virtual router and the two or more top-of-rack switches in the first virtual network; and transmit the first tunnel packet via the first layer three link of the plurality of layer three links.

In one example, various aspects of the techniques described in this disclosure are directed to a non-transitory computer-readable medium comprising instructions for causing one or more programmable processors to: receive, by a virtual router of a computing device for one or more virtual networks, a first tunnel packet comprising a first outer header and a first inner packet that defines a first packet flow; determine, based at least on the first outer header, that the first tunnel packet is associated with a first virtual network of the one or more virtual networks; associate, based on the inner packet, the first packet flow to a first layer three link of a plurality of layer three links coupling the virtual router to two or more top-of-rack switches in the first virtual network, wherein the plurality of layer three links form a layer three multi-homing connection between the virtual router and the two or more top-of-rack switches in the first virtual network; and transmit the first tunnel packet via the first layer three link of the plurality of layer three links.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
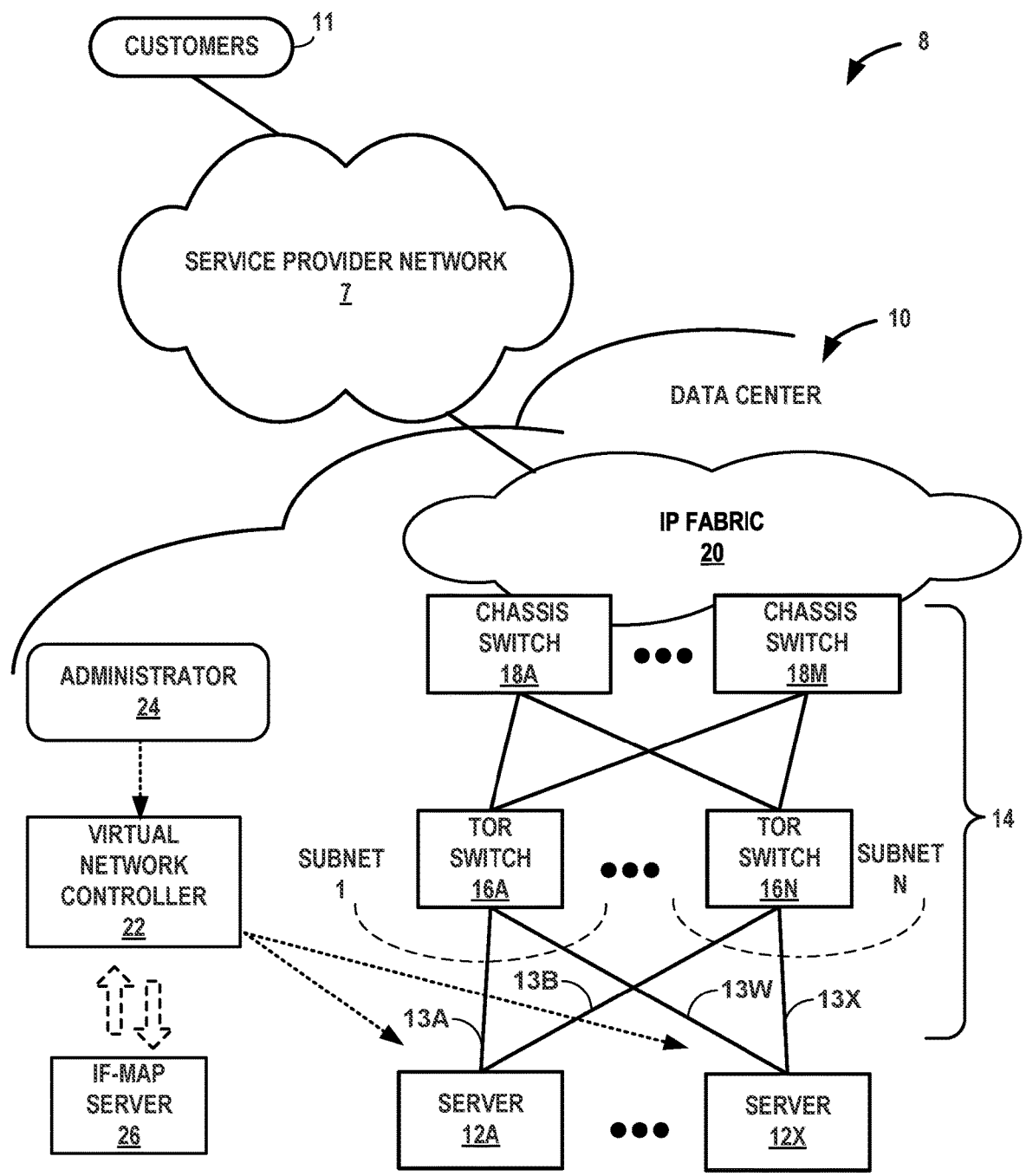
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16N (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (or, in other words, multi-homed) connectivity to IP fabric 20 and service provider network 7. Chassis switches 18 aggregate traffic flows and provides high-speed connectivity between TOR switches 16. TOR switches 16 may be network devices that provide layer two (L2, or in other words, media access control—MAC) and/or layer 3 (L3, or in other words, internet protocol—IP) routing and/or switching functionality. TOR switches 16 and chassis switches 18 may each include one or more processors and a memory, and that are capable of executing one or more software processes. Chassis switches 18 are coupled to IP fabric 20, which performs L3 routing to route network traffic between data center 10 and customers 11 via service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

One or more of servers 12 may include a virtual router that executes multiple routing instances for corresponding virtual networks within data center 10. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some instances, server 12A may be configured to provide high availability in which the underlying virtual router is configured to opaquely route traffic via multiple links 13A and 13B. In this instance, server 12A may execute the virtual router supporting routing within the virtual network in data center 10 to provide high availability, which enables the virtual router to maintain network connectivity despite various connectivity issues that may occur in data center 10, such as a degraded or unavailable link, a TOR switch 16 failure, etc. Server 12A (which executes the virtual router) may establish a link aggregation group (LAG) connection in which server 12A aggregates multiple links (such as links 13A and 13B) and presents the multiple links 13A/13B to the virtual router as a single combined link.

Server 12A may be configured to present this single link 13A/13B to the virtual router using a bonding driver that performs load balancing and other high availability features (including failover) on behalf of the virtual router. That is, server 12A may execute the bonding driver to establish the LAG that configures the virtual router to identify multiple links 13A and 13B as a single link where the bonding driver of server 12A performs load balancing (such as the above noted equal cost multi-path—ECMP—load balancing) across the multiple links 13A and 13B. As such, the virtual router may provide a packet having the above noted outer header identifying the virtual network and an inner header identifying the flow. As the bonding driver only acts on behalf of the virtual network in order to support the LAG, the bonding driver may perform load balancing only with respect to the outer header identifying the virtual network. The bonding driver may therefore only load balance on the various tunnel identifiers associated with the virtual network.

Such load balancing may result in multiple flows associated with various different types of traffic being routed via the same link (e.g., one of links 13A and/or 13B). In this respect, the LAG may not fully utilize each of links 13A and 13B and may oversubscribe traffic to a particular one of the multiple links forming the LAG (links 13A and 13B in this example) as a result of not having sufficient information (or, in other words, access to the inner header) to better load balance the traffic across links 13A/13B. The reduction in entropy resulting from a lack of deep packet inspection to identify the inner packet for purpose of hashing may result in inefficient use of links 13A/13B forming the LAG.

In addition, LAG presents multiple issues as LAG is a fragmented, manufacturer specific implementation that requires both TOR switches 16 and servers 12 to execute the same LAG protocol (such as multi-chassis LAG, which is denoted as "MC-LAG", or another variant, such as multi-chassis link aggregation, denoted as "MLAG"). As data center 10 develops an adopts different devices from different manufacturers to accommodate different customers 11, data center 10 may experience compatibility issues in which different versions or, in other words, variants of LAG are incompatible with one another. Moreover, some TOR switches 16 may not support any version of LAG (e.g., to reduce costs, complexity, etc.). As such, server 12A may not provide the benefits of high availability for various virtual routers dependent on whether TOR switches 16 support the same version, or variant, of LAG (or even any version of LAG whatsoever) as that supported by underlying servers 12.

In accordance with various aspects of the techniques described in the example of FIG. 1, a virtual router for a virtual network executes multiple routing instances for corresponding virtual networks. Each virtual network interconnects multiple virtual routers collectively implementing the virtual network. Packets received by the virtual router from the underlying physical network fabric may include an outer header to allow the physical network fabric to tunnel the payload or "inner packet" to a physical network address for a network interface of the server that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In one example of enhancing the operation of the virtual routers, a virtual router may, as described herein, establish a layer three (L3) multi-homing connection between the virtual router executed by, as an example, server 12A, and TOR switches 16 that facilitate packet delivery via the virtual networks. Rather than utilize a proprietary layer two (L2) link aggregation protocol (such as a MC-LAG, or variations thereof) that may require a particular vendor-specific link aggregation group (LAG) implementation, the virtual routers may establish the L3 multi-homing connection utilizing existing L3 protocols that are generally supported by most, if not all, TOR switches 16.

In addition to avoiding proprietary implementation of L2 link aggregation group (L2 LAG) protocols, the virtual router may perform load balancing across multiple links 13A/13B forming the L3 multi-homing connection similar to MC-LAG utilizing information in the packets that would otherwise be unavailable to servers 12A supporting execution of the virtual router. In this instance, the virtual router itself performs the load balancing based on either the outer header, the inner header of the packet (which may refer to the "inner packet" noted above), or both the outer header and the inner header of the packet. By increasing the available information for performing load balancing, the virtual router may increase entropy that results in better distribution (or, in other words, balancing) of traffic via the two or more links 13A/13B in the L3 multi-homing connection.

In this respect, various aspects of the techniques may facilitate more efficient utilization of the underlying virtual network while also reducing consumption of resources of the virtual router (or, server 12A supporting execution of the virtual router). In other words, improving load balancing may reduce retransmission of packets (due to conflicts when sending packets via oversubscribed links) and may decrease operations associated with such retransmissions (e.g., memory bandwidth, memory storage space, processing cycles, energy consumption, etc.). Moreover, in improving load balancing without requiring proprietary LAG protocols (and the corresponding bonding driver such protocols may require at servers 12), the techniques may enable better operation of virtual networks that enable inter-manufacturer compatibility while also promoting load balancing across multiple links so as to provide high availability, redundancy, higher bandwidth throughput, and the like.

In operation, an administrator 24 may interface with virtual network controller 22 to configure the L3 multi-homing connection between the virtual router executed by server 12A and TOR switches 16A and 16N. Administrator 24 may specify the L3 multi-homing connection between server 12A (and more specifically the virtual router executed by server 12A) and TOR switches 16A and 16N using configuration data that identifies the IP addresses of the interfaces associated with links 13A and 13B as being multi-homed. The L3 multi-homing connection in the example of FIG. 1 may multi-home the virtual router executed by server 12A to TOR switch 16A and 16N via links 13A and 13B, thereby establishing a potential alternative to a LAG that presents links 13A and 13B as a single link to the virtual router.

Once the L3 multi-homing connection is configured, the virtual router may next receive, for one or more virtual networks and from a workflow (which is executed by server 12A but not shown for ease of illustration purposes), a first tunnel packet comprising a first outer header and a first inner packet that defines a first packet flow (e.g., via the above noted five-tuple). The virtual router may determine, based at least on the first outer header, that the first tunnel packet is associated with a first virtual network of the one or more virtual networks. That is, the outer header may include a tunnel identifier that the virtual router has associated to the virtual network. The virtual router may parse the outer header to identify the tunnel label and perform a lookup, using the tunnel label as a key, in a routing table to identify the corresponding virtual network.

The virtual router may next associate, based on the inner packet, the first packet flow to a first layer three link (e.g., link 13A) of a plurality of layer three links 13A/13B coupling the virtual router to TOR switches 16A and 16N in the first virtual network. In other words, the virtual router itself may perform load balancing with respect to the traffic, associating, based on the inner header of the inner packet, the flow to which the packet belongs to L3 link 13A. The virtual router, in performing such load balancing, may increase entropy by virtue, potentially, of having increased access to information (e.g., the inner header of the inner packet) to which server 12A is unable or not configured to access (meaning, the bonding driver of server 12A may not be configured to perform deep packet inspection to identify the inner header of the inner packet for purposes of load balancing, as such deep packet inspection may result in jitter, packet delay, out of order packet delivery, etc. that decreases network efficiency).

The virtual router may then transmit the first tunnel packet via L3 link 13A of the plurality of layer three links 13A/13B. The virtual router may transmit subsequent packets for the same flow (as identified by the five tuple specified in the inner packet header) via the same L3 link 13A. The virtual router may implement an active-active L3 multi-homing connection in which all of the multi-homing links 13A/13B are utilized. In other words, the virtual router may associate different packet flows to different L3 links 13A/13B, where the virtual router may identify different links 13A/13B to send different packet flows to fully utilize the available bandwidth provided by links 13A/13B and thereby possibly avoid oversubscribing any one of links 13A/13B. The virtual router may employ a hash function that is applied to the inner header or a combination of the inner header and the outer header so as to associate the different packet flows with different L3 links 13A/13B identified as the multi-homing connection for the determined virtual network.

By virtue of using such a L3 multi-homing connection, TOR switches 16 need only support L3 link support. The virtual router may, in performing load balancing as an integrated feature, avoid the requirement of a bonding driver that implements a manufacturer-specific LAG protocol, which may increase compatibility between server 12A and TOR switches 16 that facilitates more seamless configuration of data center 10. Moreover, load balancing performed at the virtual router may permit better access to information (e.g., the inner header of the inner packet) that allows for better, more accurate distribution of flows between multi-homed (or, in comparison, aggregated) links 13A/13B, where such better, more accurate distribution promotes device operation in terms of resource consumption (as less packet resends due to oversubscription of links 13A/13B results in less processor cycles, less memory, less memory bandwidth, less power, etc. consumed).

Figure 2:
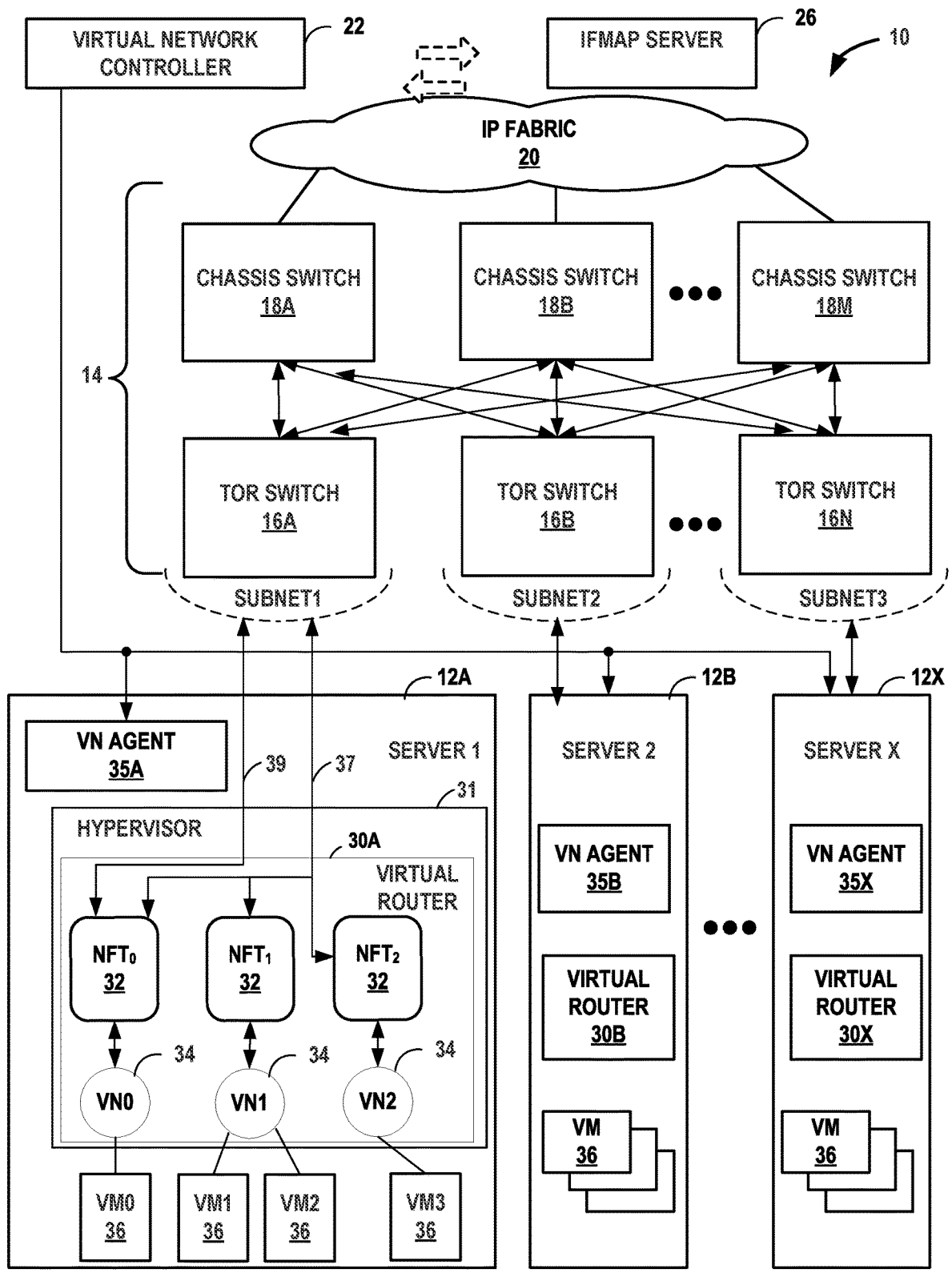
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. Virtual machines as referenced herein, e.g., VMs 36, 110, and servers 12 or a separate computing device that hosts a customer application may alternatively referred to as "hosts."

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

For example, virtual machine 36 VM1 sends a packet 41, an "inner packet," virtual router 30A by an internal link. Virtual router 30A uses $NFT_1$ to look up a virtual network destination network address for packet 41. $NFT_1$ specifies an outbound interface for virtual router 30A and encapsulation for packet 41. Virtual router 30A applies the encapsulation to add a tunnel header to generate outer packet 43 and outputs outer packet 43 on the outbound interface, in this case toward TOR switch 16A.

The routing information may, for example, map packet key information (e.g., destination IP information and other select information from packet headers) to one or more specific next hops within the networks provided by virtual routers 30 and switch fabric 14. In some case, the next hops may be chained next hop that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in the example of FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual router 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual routers 30 may communicate using virtual subnet VN0 in accordance with default network forwarding table $NFT_0$ 32 during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual routers 30 to update their local network forwarding tables 32. For example, virtual network controller 22 may output commands to virtual network agents 35 to update one or more NFTs 32 to direct virtual routers 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

In order to address network connectivity issues, such as a failed link, virtual network controller 22 may configure hypervisor 31 to support a link aggregation group (LAG) that groups two or more links (e.g., links 13A and 13B shown in the example of FIG. 1) for a given virtual network (e.g., VN1 34) as a single link. In this LAG configuration, both hypervisor 31 and TOR switch 16A need to support a common LAG protocol, such as MC-LAG, which is a vendor (or, in other words, manufacturer) specific implementation of LAG. Virtual network controller 22 may determine that both TOR switch 16A and hypervisor 31 support the same LAG protocol and issues commands to configure both hypervisor 31 and TOR switch 16A to maintain the link abstraction provided via the LAG protocol in which two or more links are presented as a single link to virtual router 30A.

Virtual network controller 22 may issue commands to hypervisor 31 to establish a bonding driver that associates the two or more links together and performs load balancing across the two or more links grouped together as the single LAG. Virtual router 30A may then output outer packets for a given virtual network of virtual networks 34 that hypervisor 31 intercepts and redirects to the bonding driver supporting the LAG. The bonding driver may then inspect the outer header of the packets, applying a hash to the outer header (e.g., a tunnel label) to distribute (or, in other words, associate) the outer packets with one of the two or more links forming the LAG. However, because the outer header has less information (e.g., only a tunnel label, which may not vary much between different packets output by virtual router 30 for a particular VN 34), the bonding driver may assign a majority of the packets to a single link of the two or more links forming the LAG. The lack of information may result in decreased entropy that does not fully utilize the bandwidth provided by all of the two or more links form the LAG.

In accordance with various aspects of the techniques described in this disclosure, virtual network controller 22 may interface with TOR switch 16A and virtual router 30A to establish a L3 multi-homing connection. That is, the techniques described in this disclosure may remove the need for MC-LAG and bonded interfaces on server 12A (e.g., one of servers 12), which executes virtual router 30A (where such virtual router may also be referred to as a "vRouter" or a "compute node"). In this example, virtual router 30A may be configured to support multiple L3 uplinks to the Top-of-Rack ("ToR" or "TOR") switches 16 without requiring support of MC-LAG by ToR switches 16 or corresponding support of a bonding driver at virtual router 30A.

In order to achieve this high-availability, virtual router 30A may support a loopback interface from which all services originate. Virtual router 30A may advertise reachability to this loopback interface using multiple L3 interfaces on server 12A. Further, virtual network controller 22 (which may also be referred to as a "fabric manager") configures TOR switches 16 with static reachability information of these loopback addresses so that traffic reaches servers 12 via ToR switches 16.

For traffic from virtual router 30A to TOR switches 16 (and switch fabric 14), virtual router 30A may use all the available L3 uplinks (e.g., L3 links 13A and 13B) toward TOR switches 16 in an active-active manner (as discussed in more detail above). To enable forwarding of traffic via the available L3 uplinks in the multi-homing connection, virtual router 30A is configured to identify the uplink end points (e.g., corresponding integrated routing and bridging—IRB—IP addresses) and uses this to information to create a composite nexthop with the legs as each of the uplink.

If there is a requirement to achieve flow stickiness (meaning, associating a particular packet flow to a particular one of the L3 links supporting the multi-homing connection), virtual router 30A may store a L3 uplink interface index (that identifies the particular one of the L3 links supporting the multi-homing connection) in the flow table for the underlay flows (including management packets sent by VN agent 35A via extensible messaging and presence protocol—XMPP) so that the reverse flow can use the same interface. As such, virtual router 30A may also store the underlay flows in the flow table (where such underly flows may be advertised via a routing protocol and stored to the flow table). Virtual router 30A may next send packets to the corresponding interface based on the associations stored to the flow table. If no flow stickiness is required, virtual router 30A uses L3 hash of the packet header to determine the uplink.

For traffic from switch fabric 14 to virtual router 30A, virtual network controller 22 may configure TOR switches 16 such that all loopback IP addresses for virtual routers 30 are reachable. Consider a 2-tier spine/leaf topology for switch fabric 14 in which virtual network controller 22 configures a spine (e.g., using one or more chassis switches 18) with the routing and bridging (RB) role as an edge routed bridging (ERB) unicast gateway and a route-reflector and virtual network controller 22 configures the leafs (e.g., one or more of TOR switches 16) with ERB access. In the multi-homing connection, virtual network controller 22 may create a new workflow, e.g., "Create Multihomed Server" where the loopback IP address of virtual router 30A along with the L3 uplink IP addresses and interfaces are configured. Virtual network controller 22 may then configure TOR switches 16 to utilize static routes towards the loopback addresses via the L3 uplinks. TOR switches 16 may further be configured to advertise this routing configuration to other TOR switches 16 via a routing protocol, such as a border gateway protocol (BGP).

For extensible messaging and presence protocol (XMPP) traffic from VN agent 31A to virtual network controller 22, each virtual router 30 may configure a loopback IP in/32 subnet in a vhost0 interface of virtual router 30A (which is not shown for ease of illustration purposes). The other IP in the subnet will be considered as a virtual-gateway (vgw)-IP hosted by virtual router 30A. This vgw IP acts as a gateway for host traffic towards switch fabric 14. Virtual network controller 22 may configure the vgw IP in virtual routers 30 as static routes added for directing the XMPP traffic to virtual network controller 22. If there is a need to reach other servers 12, virtual network controller 22 may configure virtual routers 30 with static routes for the other servers 12 via this vgw. VN agents 35 may continue to monitor vhost0 loopback IP for XMPP. When the XMPP traffic is received by virtual routers 30, virtual routers 30 use one of the L3 uplinks to send such XMPP traffic to TOR switches 16.

To enable new instances. YAML (ain't markup language—YAML) takes new parameters for multi-homed servers 12 as underlined below which needs to be entered by the user instances. YAML represents a human-readable data-serialization language used for storing configuration files that virtual network controller 22 may store and retrieve from IF-MAP server 26 (shown in the example of FIG. 1). In any event, YAML may define new parameters for the multi-homed servers 12 as shown below, where the underlined commands represent new parameters for MULTI HOMING, PHYSICAL INTERFACE LIST, PHYSICAL INTERFACE IPS, and LOOPBACK IP.

bms1:
provider: bms
ip: 10.84.27.4
roles:
openstack_compute:
vrouter:
+MULTI HOMING: true
+PHYSICAL INTERFACE LIST: eth1 eth2
+PHYSICAL INTERFACE IPS: 10.10.10.2/24 20.20.20.2/24
+LOOPBACK IP: 8.0.0.13/32
CPU_CORE_MASK: "0xff"
DPDK_UIO_DRIVER: uio_pci_generic
HUGE_PAGES: 32000
AGENT_MODE: dpdk To facilitate understanding of the example presented by the above YAML file (referred to as "instances.YAML") the foregoing assumptions are made in order to establish how virtual network router 22 may, in one example, configure the L3 multi-homing connection. In the following Table 1, chassis switch 18A is configured as the spine/route-reflector (for BGP), while TOR switches 16A, 16B and 16N are configured as leaf switches, while virtual routers 30 are configured as computes.

TABLE 1

| Device | Role | IP Address | BGP - Static Routes |
|---|---|---|---|
| Virtual Network Controller 22 | Fabric Manager | Eth1: 30.30.30.3/24 | |
| Chassis Switch 18A | Spine/Route Reflector | N/A | N/A |
| TOR Switch 16A | Leaf-1 | 10.10.10.1/24 | 8.0.0.13 via 192.168.100.11 (BGP)<br>* via 10.10.10.2 (static)<br>8.0.0.17 via 192.168.100.11 (BGP)<br>* via 10.10.10.3 (static)<br>8.0.0.21 via 192.168.100.12 (BGP) |
| TOR Switch 16B | Leaf-2 | 20.20.20.1/24 | 8.0.0.13 via 192.168.100.10 (BGP)<br>* via 20.20.20.2 (static)<br>8.0.0.17 via 192.168.100.10 (BGP)<br>* via 20.20.20.3 (static)<br>8.0.0.21 via 192.168.100.12 (BGP) |
| TOR Switch 16C | Leaf-3 | 30.30.30.1/24 | 8.0.0.13 via 192.168.100.10 (BGP)<br>via 192.168.100.11 (BGP)<br>8.0.0.17 via 192.168.100.10 (BGP)<br>via 192.168.100.11 (BGP)<br>8.0.0.21 via 30.30.30.2 (static) |

TABLE 1-continued

| Device | Role | IP Address | BGP - Static Routes |
|---|---|---|---|
| Virtual Router 30A | Compute | Lo0: 8.0.0.13/30<br>Eth0: 10.84.27.4/24<br>Eth1: 10.10.10.2/24<br>Eth2: 20.20.20.2/24 | |
| Virtual Router 30B | Compute | Lo0: 8.0.0.17/30<br>Eth0: 10.84.27.3/24<br>Eth1: 10.10.10.3/24<br>Eth2: 20.20.20.3/24 | |
| Virtual Router 30X | Compute | Lo0: 8.0.0.21/30<br>Eth0: 10.84.27.5/24<br>Eth1: 30.30.30.2/24 | |

Throughout the remainder of this disclosure, the following should be understood:
1) All new changes will be denoted using underlines henceforth in this disclosure;
2) All relevant phrases have a bold and italicized font; and
3) All the IP addresses/interfaces etc. mentioned in this document are with respect to the above topology (shown in the example of FIG. 2 along with the intended configuration outlined in Table 1 above).

To enable the servers 12 to onboard in virtual network controller 22:
a) Virtual network controller 22 may configure each leaf switch 16 (which is another way to refer to TOR switches 16) with a "underlay address pool" (which administrator 24 enters manually);
b) Alternatively, configuration of the underlay address pool can be a fabric-wide setting and virtual network controller 22 may automatically select a smaller pool per leaf switch of leaf switches 16;
c) Administrator 24 may add, via virtual network controller 22, servers 12 via a command user interface (UI) presented by virtual network controller 22 under INFRASTRUCTURE→Servers→Add Server;
d) Virtual network controller 22 may present a new option to onboard servers 12-a. INFRASTRUCTURE→Servers→Create Multihomed Server (Similar to INFRASTRUCTURE→Instances→Create Instance);
e) Administrator 24 may interface with virtual network controller 22 to enter the IP address for each interface, whereupon virtual network controller 22 may perform a validation of each entered IP address for each interface to determine that the IP address entered is in the same subnet as "underlay address pool" entered in switch fabric 14; and
f) Virtual network controller 22 may also prompt administrator 24 to enter an additional parameter for the loopback IP address of servers 12.

In terms of provisioning, virtual network controller 22 may be configured to enable the following:
a) The provisioning scripts take the new parameters from virtual network instances (e.g., the instances.YAML file), where YAML may add the above new parameters in /etc/contrail/contrail-vrouter-agent.conf-
b) The new parameters takes the subnet route for each of the links and replaces the last byte with "0.1" indicating that such a subnet route is the gateway;
c) There is an existing parameter called 'gateway' in the conf file that accepts a single IP address value. The 'gateway' parameter may, in some instances, accept a list of IP addresses. Virtual network controller 22 may also be configured to enable the 'physical_interface' parameter to accept the single IP address value or a list of IP addresses.

[CONTROL-NODE]
servers=30.30.30.3:5269
[VIRTUAL-HOST-INTERFACE]
+multihoming=yes
name=vhost0
ip=8.0.0.13/30
compute_node_address=8.0.0.2
+gateway=10.10.10.1, 20.20.20.1
+physical interface=eth1,eth2

In the foregoing, the new parameter multihoming is set to "true" for the VIRTUAL-HOST-INTERFACE (which refers to the vhost0 interface) of virtual router 30A (as identified by ip=8.0.0.13/30—which is the Lo0—loopback—IP address of virtual router 30A). Administrator 24 also sets the new gateway parameter equal to the IP addresses of Leaf-1 (TOR switch 16A) and Leaf-2 (TOR switch 16B) that are associated with interfaces of TOR switches 16A and 16B terminating links 13A and 13B forming the multi-homing connection. Administrator 24 may also configure the new physical_interface parameter to identify the two Ethernet interfaces of virtual router 30A to participate in the multi-homing connection, where these two Ethernet interfaces (eth1, eth2) reference the Eth1 and Eth2 shown in Table 1 for virtual router 30A and terminate the other end of links 13A and 13B forming the multi-homing connection. Administrator 24 also configures CONTROL-NODE to reference Eth1 interface IP address of virtual network controller 22 so that virtual router 30A may communicate with virtual network controller 22.

Provisioning as performed by virtual network controller 22 may also involve the following:
d) Further, the foregoing new parameters may enable the following—
Virtual network controller 22 may configure multihomed interfaces with their respective IP addresses as shown below.
(vrouter-agent) [root@a7s5-kiran /]$ ifconfig eth0
eth1:  flags=6211<UP,BROADCAST,RUNNING,SLAVE,MULTICAST> mtu 1500
inet 10.10.10.2 netmask 255.255.255.0 broadcast 8.0.0.255
inet6 fe80::92e2:baff:fe84:4888 prefixlen 64 scopeid 0x20<link>
ether 00:1b:21:bb:f9:46 txqueuelen 1000 (Ethernet)
RX packets 4522540 bytes 6010194413 (5.5 GiB)
RX errors 0 dropped 0 overruns 0 frame 0
TX packets 1143171 bytes 425370068 (405.6 MiB)
TX errors 0 dropped 0 overruns 0 carrier 0 collisions 0
(vrouter-agent) [root@a7s5-kiran /]$ ifconfig eth1
eth2:  flags=6211<UP,BROADCAST,RUNNING,SLAVE,MULTICAST> mtu 1500
inet 20.20.20.2 netmask 255.255.255.0 broadcast 8.0.0.255 inet6 fe80::92e2:baff:fe84:4888 prefixlen 64 scopeid 0x20<link>
ether 00:1b:21:bb:f9:47 txqueuelen 1000 (Ethernet)
RX packets 4522540 bytes 6010194413 (5.5 GiB)
RX errors 0 dropped 0 overruns 0 frame 0
TX packets 1143171 bytes 425370068 (405.6 MiB)
TX errors 0 dropped 0 overruns 0 carrier 0 collisions 0

In the above, administrator 24 may interface with virtual network controller 22 to specify that eth1 and eth2 are set to IP addresses having the values shown in Table 1 above (e.g., 10.10.10.2 and 20.20.20.2 respectively).

The foregoing new parameters may also result in the following:

Virtual network controller 22 may process the new parameters to add the uplink interfaces to virtual routers 30 per the following:

(vrouter-agent) [root@a7s5-kiran /]$ vif -add eth1 --mac 00:1b:21:bb:f9:46
--vrf 0
--vhost-phys --type physical
(vrouter-agent) [root@a7s5-kiran /]$ vif -add eth2 --mac 00:1b:21:bb:f9:47
--vrf 0
--vhost-phys --type physical
(vrouter-agent) [root@a7s5-kiran /]$ vif -get 0
vif0/0 OS: eth0 (Speed 10000, Duplex 1)
  eth1 (Speed 10000, Duplex 1)
Type:Physical HWaddr:00:1b:21:bb:f9:46 IPaddr: 8.0.0.13
Vrf:0 Mcast Vrf:65535 Flags:TcL3L2VpEr QOS:−1 Ref:7
RX packets:158680 bytes:40885359 errors:0
TX packets:161631 bytes:211041654 errors:0
Drops:0

Virtual network controller 22 may generate the following commands (that may conform to a syntax of a command line interface presented by server 12A) from the above YAML configuration data (having the new parameters) to configure virtual router 30A with the L3 multi-homing connection. In the above, virtual network router 22 may specify the eth1 and eth2 interfaces by way of MAC addresses, adding eth1 and eth2 with a particular speed and duplex value (identifying if the link is unidirectional via a value of zero or bidirectional via a value of one—as entered in the above example configuration commands).

The foregoing new parameters may additionally result in the following:

The control-data interface will still be the vhost0 interface of virtual routers 30 and the vhost0 interface hosts the loopback IP address as specified above in instances.YAML. Services, such as XMPP, originate from vhost0 interface of virtual routers 30, which is shown below in the following configuration commands generated by virtual network controller 22 to configure the vhost0 interface.

(vrouter-agent) [root@a7s5-kiran /]$ ifconfig vhost0
vhost0: flags=4163<UP,BROADCAST,RUNNING,MULTICAST> mtu 1500
inet 8.0.0.13 netmask 255.255.255.252 broadcast 8.0.0.255
inet6 fe80::21b:21ff:febb:f946 prefixlen 64 scopeid 0x20<link>
ether 00:00:5e:00:01:01 txqueuelen 1000 (Ethernet)
RX packets 167054 bytes 41988024 (40.0 MiB)
RX errors 0 dropped 0 overruns 0 frame 0
TX packets 140502 bytes 214799146 (204.8 MiB)
TX errors 0 dropped 0 overruns 0 carrier 0 collisions 0

In some instances, the MAC address of vhost0 can be any MAC address.

Virtual network controller 22 may also configure the following:

e) All Loopback IPs of computes will be in/32. The other IP in the subnet will be considered the virtual-gateway. For example, if loopback IP is 8.0.0.13/32, the vgw is automatically considered as 8.0.0.14/32, which is discussed below in more detail. The controller IP will have this vgw IP as the gateway as shown below.

(vrouter-agent) [root@a7s5-kiran /]$ cat/etc/sysconfig/network-scripts/ifcfg-vhost0
NETMASK=255.255.255.252
BOOTPROTO=none
DEVICE=vhost0
IPADDR=8.0.0.13
ONBOOT=yes
TYPE=kernel
NM_CONTROLLED=no The foregoing results in virtual network controller 22 configuring a route table as shown below.

(vrouter-agent) [root@a7s5-kiran /]$route-n
Kernel IP routing table
Destination Gateway Genmask Flags Metric Ref Use Iface
0.0.0.0 10.84.27.254 0.0.0.0 UG 0 0 0 eth0
10.84.27.0 0.0.0.0 255.255.255.0 U 0 0 0 eth0
10.10.10.0 0.0.0.0 255.255.255.0 U 0 0 0 eth1
20.20.20.0 0.0.0.0 255.255.255.0 U 0 0 0 eth2
30.30.30.3 0.0.0.0 255.255.255.255 U 0 0 0 vhost0
8.0.0.17 0.0.0.0 255.255.255.255 U 0 0 0 vhost0

In this respect, virtual network controller 22 may define the following:

0.0.0.0→default gateway
8.0.0.12/32→loopback subnet of the current compute (compute-1 //which may refer to virtual router 30A in the example of FIG. 2)
10.84.27.0/24→management subnet //(which is the subnet to which virtual network controller 22 belongs)
10.10.10.0/24→L3 uplink subnet for Leaf-1 //(which is the subnet to which TOR switch 16A belongs)
20.20.20.0/24→L3 uplink subnet for Leaf-2 //(which is the subnet to which TOR switch 16B belongs)
30.30.30.3/32→controller IP address via vhost0 8.0.0.14 //(which is the IP address associated with the interface by which to reach virtual network controller 22 via the above noted virtual gateway—vgw)
8.0.0.17/32→loopback subnet of compute-2 via vhost0 8.0.0.14

After virtual network controller 22 has provisioned virtual router 30A, VN agent 35A may configure the following address resolution protocol (ARP) table in which the virtual gateway is configured for purposes of directing traffic (e.g., XMPP traffic) to virtual network controller 22:

(vrouter-agent) [root@a7s5-kiran /]$ arp -an
(8.0.0.14) at 00:00:5e:00:01:02 [ether] on vhost0 β vgw of loopback subnet
(10.84.27.4) at 0c:c4:7a:4c:16:6a [ether] on eth0 β management subnet via eth0
(10.84.27.2) at 0c:c4:7a:4c:18:3a [ether] on eth0 β Management subnet via eth0
(10.10.10.1) at 00:aa:00:00:00:01 [ether] on eth1 β L3 uplink subnet via leaf1-IRB0
(20.20.20.1) at 00:bb:00:00:00:01 [ether] on eth2 β L3 uplink subnet via leaf2-IRB0

In some instances, virtual network controller 22 may configure the MAC address of the virtual gateway and vhost0 to be different.

In terms of the datapath, virtual network controller 22 may configure the following:

1) When the uplink interfaces are added to virtual router 30A using the "vif --add" command as mentioned above, the interfaces are stored in a 'vif' data structure. For this configuration, virtual network controller 22 may redefine "vif→vif_os" into an array to store multiple uplink interfaces (vif→vif_os [4]) in order to enable L3 multi-homing connections within the configuration of virtual routers 30A.

2) The MAC Addresses are queried and stored in the 'vif' structure. For this, vif→vif_mac [ETHER_ALEN] is made into an array (vif→vif_mac[4] [ETHER_ALEN])

3) VN agent 35A sends ARP request to resolve the uplink gateways (10.10.10.1, 20.20.20.1) and programs the encapsulation next hops (NHs) for each uplink gateway, as shown below.

(vrouter-agent) [root@a7s4-kiran /]$ rt --dump 0 |grep "10.10.10.1/32" 10.10.10.1/32 32 T -23 -
(vrouter-agent) [root@a7s4-kiran /]$ nh --get 23
Id:23 Type:Encap Fmly: AF_INET Rid:0 Ref_cnt:2 Vrf:0
Flags:Valid, Etree Root,
EncapFmly:0806 Oif:0 Len:14
Encap Data: 00 aa 00 00 00 01 00 1b 21 bb f9 46 08 00
(vrouter-agent) [root@a7s4-kiran /]$ rt --dump 0 |grep "20.20.20.1/32" 20.20.20.1/32 32 T -33 -
(vrouter-agent) [root@a7s4-kiran /]$ nh --get 33
Id:23 Type:Encap Fmly: AF_INET Rid:0 Ref_cnt:2 Vrf:0
Flags:Valid, Etree Root,
EncapFmly:0806 Oif:0 Len:14
Encap Data: 00 bb 00 00 00 01 00 1b 21 bb f9 47 08 00

In the above, underlines indicate MAC addresses of uplink gateways and italics indicate MAC addresses of local uplink interfaces (eth1, eth2)

In terms of the datapath, virtual network controller 22 may additionally configure the following:

4) Consider VM1 36 in virtual router 30A and a VM2 in virtual router 30B, where both of virtual router 30A and 30B support the same VN1 in subnet 1.1.1.0/24. When a route add comes from virtual network controller 22 to VN agents 35, VN agents 35 determines that the remote VM (from either perspective) is in another virtual router 30 and creates a tunnel NH to the other one of virtual routers 30 supporting VN1. In this respect, virtual routers 30 are each reachable via two L3 uplinks (e.g., links 13A and 13B). As such, VN agent 35 creates a composite NH which have the component NHs as tunnel NHs to the two uplinks as shown below.

(vrouter-agent) [root@a7s4-kiran /]$ nh --get 35
Id:35 Type:Composite Fmly:AF_INET Rid:0 Ref_cnt:4 Vrf:2
Flags:Valid, Multicast, Etree Root,
Sub NH(label): 27(48) 34(48)
Id:27 Type:Tunnel Fmly: AF_INET Rid:0 Ref_cnt:9 Vrf:0
Flags:Valid, MPLSoUDP, Etree Root,
Oif:0 Len:14 Data: 00 aa 00 00 00 01 00 1b 21 bb f9 46 08 00
Sip:8.0.0.13 Dip:8.0.0.17
Id:34 Type:Tunnel Fmly: AF_INET Rid: 0 Ref_cnt: 9 Vrf: 0
Flags:Valid, MPLSoUDP, Etree Root,
Oif:1 Len:14 Data: 00 bb 00 00 00 01 00 1b 21 bb f9 47 08 00
Sip:8.0.0.13 Dip:8.0.0.17

In the foregoing example, the Encap data of the component NHs are different. Each of the component NHs point to a different link using the destination MAC (DMAC) addresses of the respective gateways. Further, the MPLS labels (48) is the same for both components. As such, virtual routers 30 are configured to use separate L3 interfaces for forwarding traffic for the same path, effectively establishing a L3 multi-homing connection that virtual routers 30 manage in terms of load balancing, failover, and other active-active high availability operations. In this way, virtual router 30A may configure a tunnel (via MPLS or other tunneling protocols listed above) that operates via the multi-homing connection such that the tunnel packets receives a label (e.g., an MPLS label) identifying the first tunnel regardless of whether the first packet flow is associated with the first L3 link or a different L3 link supporting the multi-homing connection.

In terms of the datapath, virtual network controller 22 may further configure the following.

5) Virtual router 30A may have additional logic to indicate that, when multihoming is enabled, Oif 0 (physical interface) in the composite NH potentially requires additional processing. For example, virtual router 30 may obtain the source MAC (SMAC) addresses from the encapsulation data and matches the obtained SMAC addresses with the L3 uplink MAC addresses that virtual router 30A has stored in the 'vif' structure. Virtual router 30A may next transmit the packet via on the determined L3 uplink after updating the packet to include so-called rewrite info (which may include an Ethernet header).

6) In order to achieve flow stickiness (in which a given flow is associated with one of the two or more links forming the multi-homing connection), virtual router 30A may maintain a 'underlay idx' in the flow-entry. Virtual router 30A may overload the variable 'fe→fe_ecmp_nh_index' for this purpose. In some examples, the Most-significant 2 bits of 'fe→fe_ecmp_nh_index' indicate the underlay index, while the lower 6 bits of 'fe→fe_ecmp_nh_index' indicate the ECMP index. In these examples, 'fe→fe_ecmp_nh_index' provides space to store four L3 uplinks and 64 ECMP paths. Although described with respect to an 8-bit 'fe→fe_ecmp_nh_index, 'various aspects of the techniques may enable different bit-depths for 'fe→fe_ecmp_nh_index' to accommodate more L3 uplinks and ECMP paths.

In terms of the datapath, the following may also be configured.

7) VN agent 35, when creating a flow, populates this index in the flow entry and virtual router 30A uses this index (L3 interface) in the composite Tunnel NH to send out the packet, thus achieving active-active load balancing of flows without bonding, as shown below.

Index Source:Port/Destination:Port Proto(V)
90848<=>430624 1.1.1.4:1180 1 (2)
1.1.1.5:0
(Gen: 1, K(nh):29, Action:F, Flags:, U:1, QOS:−1, S(nh):21,
Stats:4/392,
SPort 49490,
TTL 0, Sinfo 8.0.0.3)
430624<=>90848 1.1.1.5:1180 1 (2)
1.1.1.4:0
(Gen: 1, K(nh):29, Action:F, Flags:, U:1, QOS:−1, S(nh):29,
Stats:4/392,
SPort 52824,
TTL 0, Sinfo 3.0.0.0)

In the above, "U" indicates an underlay index.

In terms of the datapath, the following may further be configured.

8) Connectivity between VN agent 35A and virtual network controller 22 (e.g., for XMPP) is achieved as follows:

VN agent 35A is configured to monitor vhost0 and binds vhost0 to the loopback IP address. VN agent 35A may attempt to establish XMPP/TCP connection to virtual network controller 22.

The route table provided by hypervisor 31 (and therefore the underlying operating system) has a static route to virtual network controller 22 via virtual gateway, as shown below.
<snip>
30.30.30.3 0.0.0.0 255.255.255.255 U 0 0 0 vhost0
</snip>

In terms of the datapath, the following may be configured as further shown below.

9) The operating system stack now starts sending XMPP TCP packets to vhost0 with DMAC as the above VRRP MAC.

10) If we want to achieve active-active load balancing of host/XMPP flows, virtual router 30 and/or VN agent 35 may store the underlay index for these underlay flows in the flow table. Virtual network controller 22 may enable a policy on vhost0 in which the underlay routes are learned in the flow table, which may ensure flow stickiness and load balancing of the L3 uplinks for vhost0 traffic.

11) For traffic received from switch fabric 14 via TOR switches 16, the following may occur:

Switch fabric 16 may send overlay and underlay packets in inet0 table towards the virtual routers 30.

For the packets from switch fabric 14, DMAC=<eth0/eth1 MAC address>, SMAC=<IRBO MAC>, DIP=<loopback IP>, SIP=<loopback IP of src)

Because virtual router 30A is monitoring eth1 and eth2, virtual router 30A receives these packets via the Receive NH in the virtual router 30A, as shown below.

(vrouter-agent) [root@a7s4-kiran /]$ rt --dump 0 |grep "8.0.0.13/32"
8.0.0.13/32 32 T -10 -
(vrouter-agent) [root@a7s4-kiran /]$ nh --get 10
Id:10 Type:Receive Fmly: AF_INET Rid:0 Ref_cnt:4 Vrf:1
Flags:Valid, Policy(R), Etree Root,
Oif:1

After this, regular packet path will hold good for overlay and host (XMPP) packets.

For the data plane development kit (DPDK), the following may apply.
a) Provisioning scripts may bind the L3 interfaces to DPDK;
b) Virtual network controller 22 may create tap interfaces representing the L3 uplink interfaces and cross connect them to the corresponding network interface cards (NICs); and
c) Virtual network controller 22 may create additional queues to logical cores for each multi-homed interface.

For switch fabric 14, the following may apply:
a) Switch fabric 14 can be onboarded (or in other words, configured for a particular virtual network 36) in a standard way;
b) The spine RB roles can be RR+ERB multicast (MCast) gateway;
c) Leaf RB roles can be ERB unicast (Ucast) gateway; and
d) Switch fabric 14 may accept a parameter—"underlay IP subnet" and virtual network controller 22 may carve out smaller subnets for each of the leaf switches 16;
e) Alternatively, user can configure it manually; and
f) For each of virtual routers 30 which is onboarded, virtual network controller 22 may advertise a static router to leaf switches 16 or otherwise interface with leaf switches 16 to configure the static route at leaf switch 16.

More information regarding various aspects of the techniques described in this disclosure (along with alternative examples) can be found in a document entitled "L3 Multi-homing Blueprint" uploaded to Github on Nov. 2, 2020, and accessible via online address "github.com/tungstenfabric/tf-specs/commit/6db4d1078fb5f15275a1881c3ad96743b9de-9 fa5?short_path=af8efa2," the entire contents of which are incorporated by reference as if set forth in its entirety.

Figure 3:
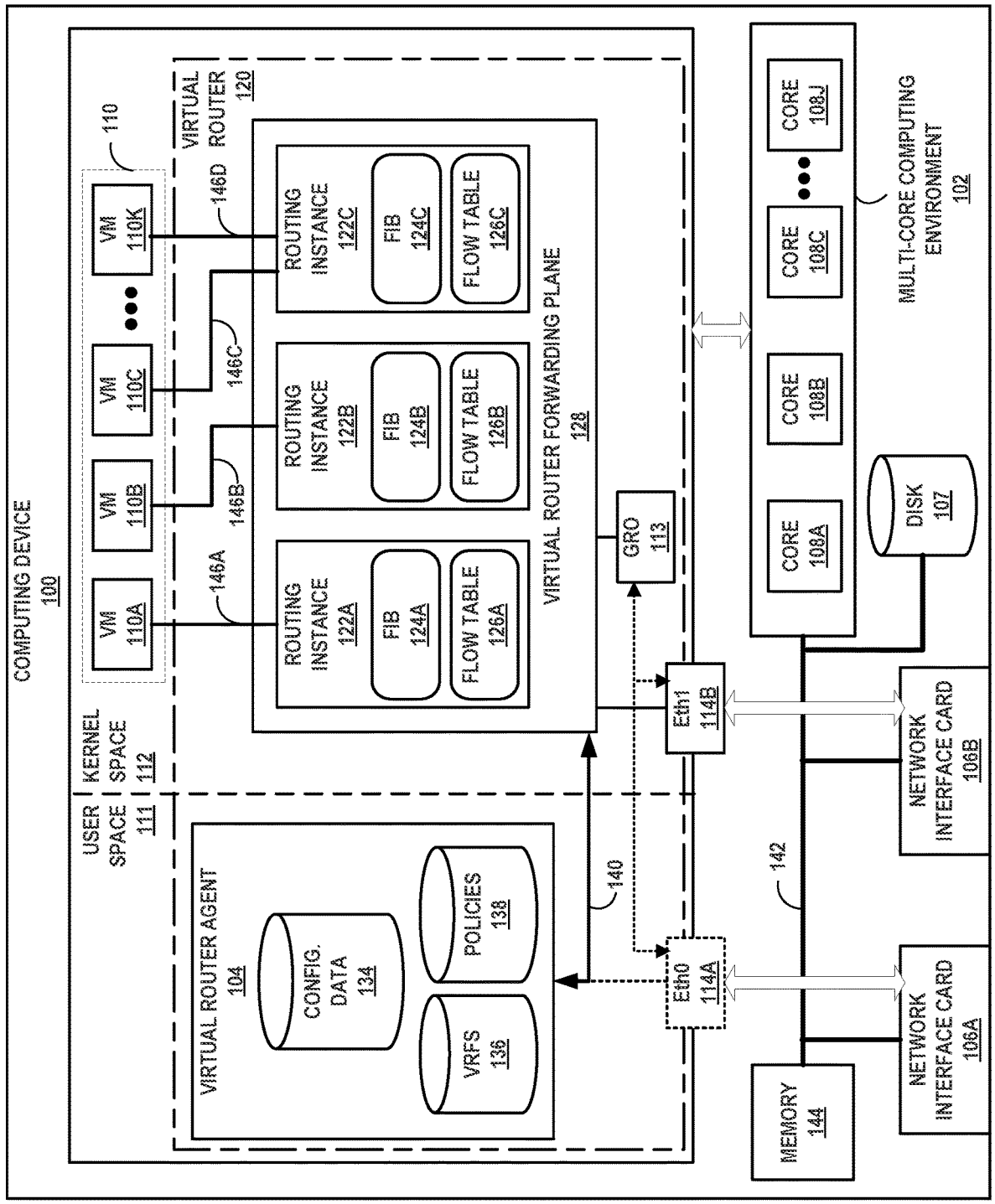
FIG. 3 is a block diagram illustrating a computing device that executes an example virtual router for virtual networks according to techniques described herein.

FIG. 3 is a block diagram illustrating a computing device that executes an example virtual router for virtual networks according to techniques described herein. Computing device 100 may represent any of servers 12 of FIGS. 1-2 or other device, such as any of TOR switches 16.

Computing device 100 includes in this example a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any form or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more virtual machines 110A-110K (collectively, "virtual machines 110"). Virtual machines 110 may represent example instances of any of virtual machines 36 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in the example of FIG. 3) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in the example of FIG. 3). An example hypervisor 31 is illustrated in FIG. 2. Example hypervisors include Kernel-based Virtual Machine (KVM) for the Linux kernel, Xen, ESXi available from VMware, Windows Hyper-V available from the Microsoft Corp., and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of VM 110A that taps, via tap interface 146A, into routing instance 122A.

Virtual router 120 in this example includes a kernel space 112 module: virtual router forwarding plane 128, as well as a user space 111 module: virtual router agent 104. Virtual router forwarding plane 128 executes the "forwarding plane" or packet forwarding functionality of the virtual router 120 and virtual router agent 104 executes the "control plane" functionality of the virtual router 120. Virtual router agent 104 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses.

Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request virtual router agent 104 to install a flow table entry in the flow table for the new packet flow. This may be referred to as "slow-path" packet processing for initial packets of packet flows and is represented in FIG. 3 by slow path 140.

In this example, virtual router agent 104 may be a user space 111 process executed by computing device 100. Virtual router agent 104 includes configuration data 134, virtual routing and forwarding instances configurations 136 ("VRFs 136"), and policy table 138 ("policies 138"). Virtual router agent 104 exchanges control information with one or more virtual network controllers (e.g., VNC 22 of FIGS. 1-2) via, as one example, XMPP packets. Control information may include, virtual network routes, low-level configuration state such as routing instances and forwarding policy for installation to configuration data 134, VRFs 136, and policies 138. Virtual router agent 104 may also report analytics state, install forwarding state to FIBs 124 of virtual router forwarding plane 128, discover VMs 110 and attributes thereof. As noted above, virtual router agent 104 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

In some instances, virtual router forwarding plane 128 of virtual router 120 may be configured as noted above with respect to the example of FIG. 2 to support load balancing across the two or more links supporting the configured L3 multi-homing connection for virtual router 120. As such, virtual router forwarding plane 128 may receive outer packets and perform the above noted ECMP or other load balancing algorithm to associate packet flows to which the inner packets correspond to one of the two or more L3 links 13A/13B supporting the L3 multi-homing connection.

Virtual network controller 22 may configure virtual router 120 and TOR switches 16 in the manner described above (potentially as shown by way of example with respect to the above Table 1 and corresponding discussion of the new parameters and configuration commands). Virtual network controller 22 may interface with virtual router 120 via virtual router agent 104 which may represent an example of VN agent 35A shown in the example of FIG. 2) to configure virtual router forwarding plane 128 to support a routing instance 122A in which the foregoing examples of the FIB and flow tables (which may represent portions of FIB 124A and flow table 126A in some examples) discussed above with respect to the example of FIG. 2 are configured to provide the L3 multi-homing connection.

Once the L3 multi-homing connection is configured, virtual router forwarding plane 128 may next receive, for one or more virtual networks (e.g., as represented by routing instance 122A) and from a workflow (which is executed by computing device 100 as VM 110A in this example), a first tunnel packet comprising a first outer header and a first inner packet that defines a first packet flow (e.g., via the above noted five-tuple). Virtual router forwarding plane 128 may determine, based at least on the first outer header, that the first tunnel packet is associated with routing instance 122A of the one or more virtual networks 122. That is, the outer header may include a tunnel identifier that virtual router forwarding plane 128 has associated with routing instance 122A. Virtual router forwarding plane 128 may parse the outer header to identify the tunnel label and perform a lookup, using the tunnel label as a key, in a routing instance table to identify routing instance 122A.

Virtual router forwarding table 128 may next associate, based on the inner packet, the first packet flow to a first layer three link (e.g., link 13A) of a plurality of layer three links 13A/13B coupling virtual router 120 to TOR switches 16A and 16N in the routing instance 122A. In other words, virtual router forwarding plane 128 itself may perform load balancing with respect to the traffic, associating, based on the inner header of the inner packet, the flow to which the packet belongs to L3 link 13A (as one example).

Virtual router forwarding plane 128, in performing such load balancing, may increase entropy by virtue, potentially, of having increased access to information (e.g., the inner header of the inner packet) to which server 12A is unable or not configured to access (meaning, the bonding driver of server 12A may not be configured to perform deep packet inspection to identify the inner header of the inner packet for purposes of load balancing, as such deep packet inspection may result in jitter, packet delay, out of order packet delivery, etc. that decreases network efficiency). Moreover, virtual router forwarding plane 128 may perform such load balancing without requiring any supplementary bonding driver that may be used to facilitate MC-LAG or other LAG configurations.

Virtual router forwarding plane 128 may then transmit the first tunnel packet via L3 link 13A of the plurality of layer three links 13A/13B. Virtual router forwarding plane 128 may transmit subsequent packets for the same flow (as identified by the five-tuple specified in the inner packet header) via the same L3 link 13A. Virtual router forwarding plane 128 may implement an active-active L3 multi-homing connection in which all of the multi-homing links 13A/13B are utilized. In other words, virtual router forwarding plane 128 may associate different packet flows to different L3 links 13A/13B, where virtual router forwarding plane 128 may identify different links 13A/13B to send different packet flows to fully utilize the available bandwidth provided by links 13A/13B and thereby possibly avoid oversubscribing (or underutilizing) any one of links 13A/13B. Virtual router forwarding plane 128 may employ a hash function that is applied to the inner header or a combination of the inner header and the outer header so as to associate the different packet flows with different L3 links 13A/13B identified as the multi-homing connection for determined routing instance 122A.

Figure 4:
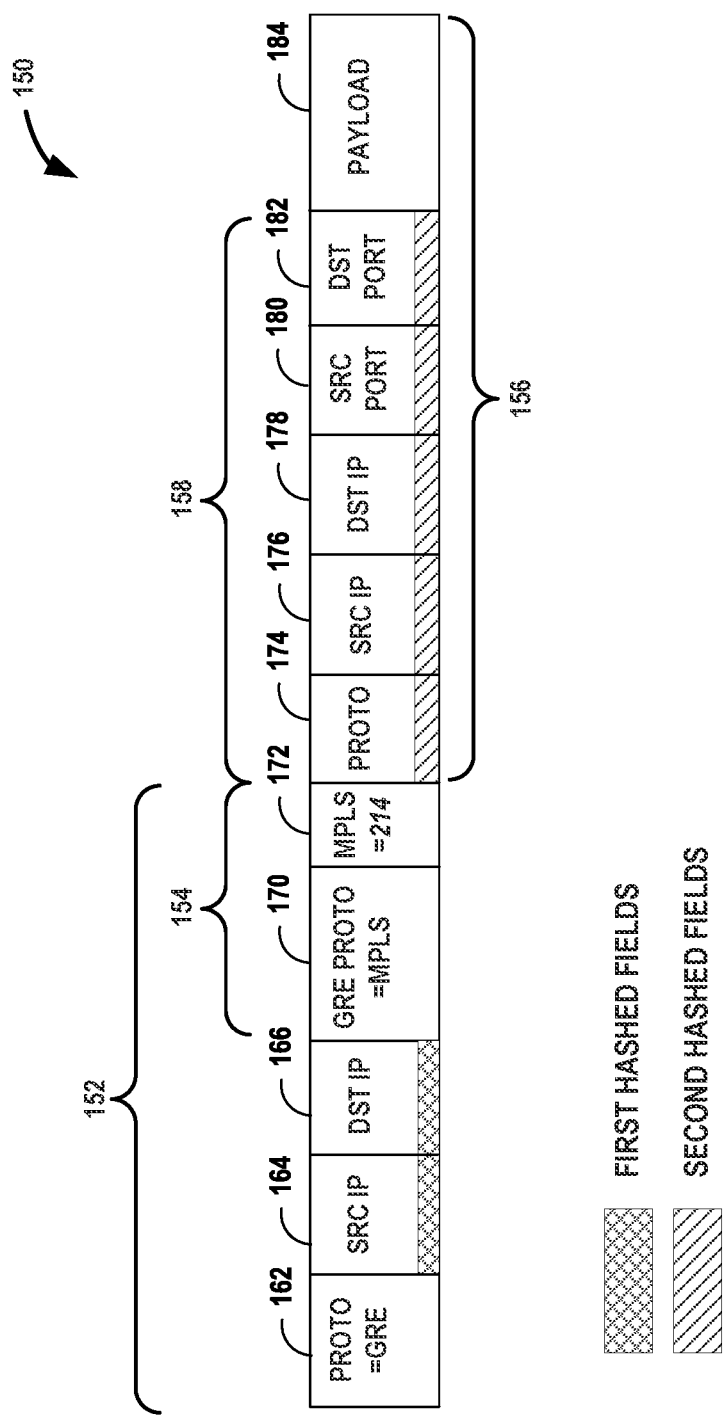
FIG. 4 is a block diagram illustrating the tunnel packet format and annotated to indicate example fields of the outer and inner header for hash operations for packet load balancing according to the L3 multi-homing techniques described herein.

FIG. 4 is a block diagram illustrating the tunnel packet format and annotated to indicate example fields of the outer and inner header for hash operations for receive packet load balancing according to the L3 multi-homing techniques described herein. "Outer" or "tunnel" packet 150 includes outer header 152 and inner or "encapsulated" packet 156. Outer header 152 may include protocol or type-of-service (TOS) field 162 and public (i.e., switchable by the underling physical network for a virtual network associated with inner packet 156) IP address information in the form of source IP address field 164 and destination IP address field 166. Protocol field 162 in this example indicates tunnel packet 150 uses GRE tunnel encapsulation, but other forms of tunnel encapsulation may be used in other cases, including IPinIP, NVGRE, VxLAN, and MPLS over MPLS, for instance.

Outer header 152 also includes tunnel encapsulation 154, which in this example includes GRE protocol field 170 to specify the GRE protocol (here, MPLS) and MPLS label field 172 to specify the MPLS label value (here, 214). The MPLS label field is an example of a virtual network identifier and may be associated in a virtual router (e.g., virtual router 120 of computing device 100 of FIG. 3) with a routing instance for a virtual network.

Inner packet 156 includes inner header 158 and payload 184. Inner header 158 may include protocol or type-of-service (TOS) field 174 as well as private (i.e., for a particular virtual routing and forwarding instance) IP address information in the form of source IP address field 176 and destination IP address field 178, along with transport layer information in the form of source port field 180 and destination port field 182. Payload 184 may include application layer (layer 7 (L7)) and in some cases other L4-L7 information produced by or for consumption by a virtual machine for the virtual network. Payload 184 may include and thus alternatively be referred to as an "L4 packet," "UDP packet," or "TCP packet."

In this example, virtual router forwarding plane 128 shown in the example of FIG. 3 is configured to apply a first hash function to inner header 158 and possible outer header 152 in order to assign the underlying packet flow identified by inner header 158 to one of L3 links supporting the multi-homed connection.

Figure 5:
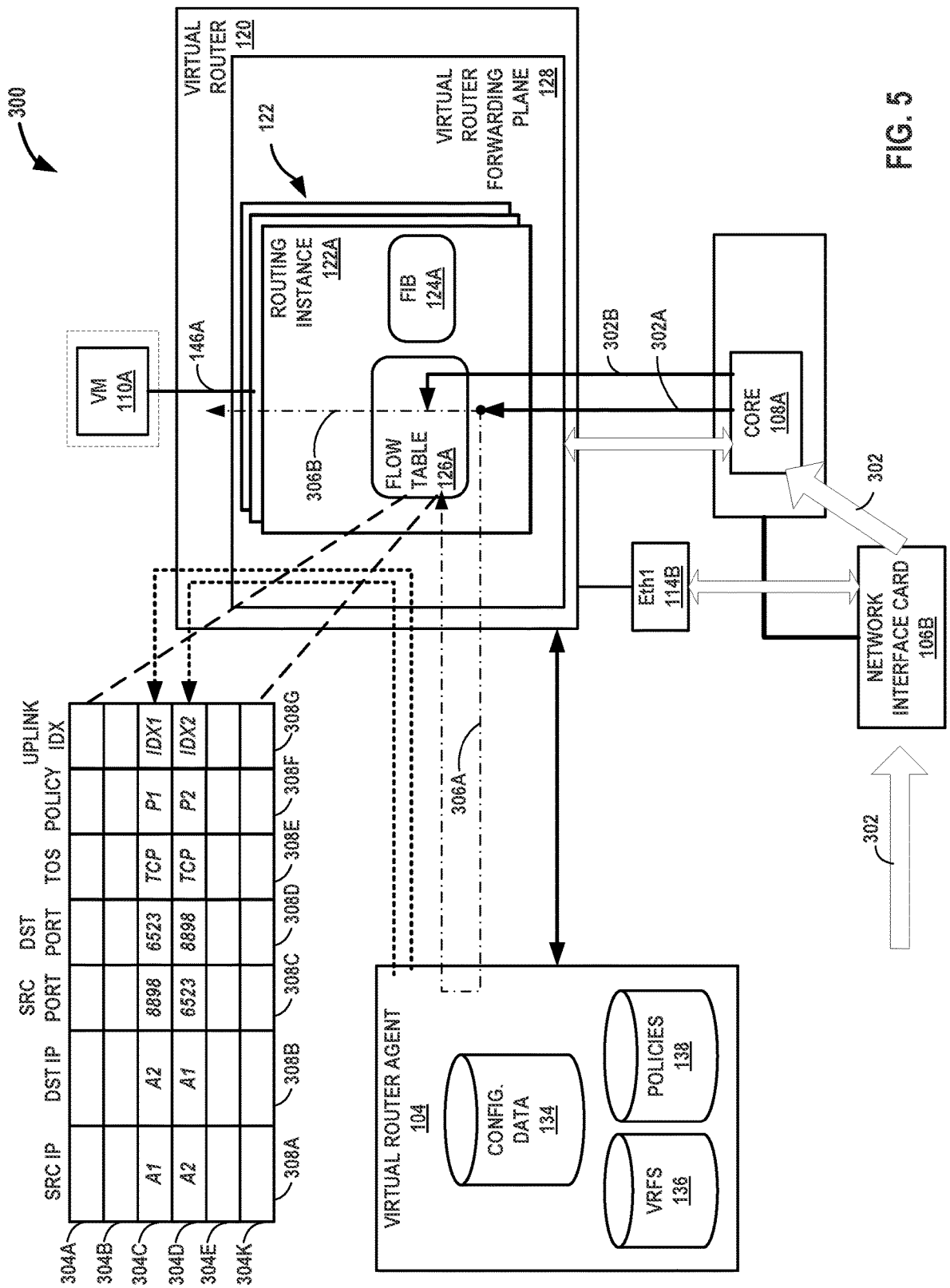
FIG. 5 is a block diagram illustrating example components of an example computing device that executes a virtual router for virtual networks according to techniques described herein.

FIG. 5 is a block diagram illustrating example components of an example computing device that executes a virtual router for virtual networks according to techniques described herein. Computing device 300 is configured to support L3 multi-homing connections that offers potentially improved load balancing compared to alternative LAG configurations.

Flow table 126A of routing instance 122A identifies packet flows and specifies forwarding or other policies to apply to flows that match any of the flow table entries 304A-304K (collectively, "flow table entries 304"). Flow table entries 304 in this example include matching fields for the 5-tuple with which to map flow, i.e., source IP address ("SRC IP") 308A, destination IP address ("DST IP") 308B, source port ("SRC PORT") 308C, destination port ("DST PORT") 308D, and type of service (TOS) 308E. In addition, each of flow table entries 304 specifies a policy for application to packet flows that match the corresponding matching fields of the flow table entry 304.

Virtual router forwarding plane 128 executed by computing device 300 receives packet flows 302 from NICs 106 for processing and forwarding. Packet flows 302 include packets tunneled for one or more virtual networks. Virtual router forwarding plane 128 processes each tunnel packet to determine a virtual network and select the corresponding routing instance 122 with which to process the tunneled packet according to policies configuration data 134, virtual routing and forwarding instances configurations 136 ("VRFs 136"), and policy table 138 ("policies 138") of virtual router agent 104. Policy table 138 represents a table, database, or other data structure that includes one or more policies that define operations to be applied by virtual router 120 to packet flows that traverse virtual router 120.

Upon receiving a tunneled packet (i.e., an inner packet of a "tunnel packet") that none of flow table entries 304 of flow table 126A match (e.g., an initial packet of a new flow), routing instance 122A processes the tunneled packet according to the virtual router 120 "slow path" 306A, which may be an example of slow path 140. Slow path 306A includes virtual router agent 104, which determines for the tunneled packet one of policies 138 to apply to the tunneled packet and therefore to any additional packets for the flow for the tunneled packet received by virtual router forwarding plane 128 while the flow is active. Virtual router agent 104, upon determining a policy for a flow, installs a flow table entry 304 for the flow to flow table 126A for application by virtual router forwarding plane 128 to subsequent packets that match the flow matching fields of the flow table entry 304, according to virtual router 120 "fast path" 306B. The appropriate policy to apply to a packet being specified by one of flow table entries 304, processing a packet according to fast path 306B may be performed by virtual router forwarding plane 128 without recourse to virtual router agent 104.

In the illustrated example, virtual router agent 104 also identifies a L3 uplink interface index 308G ("UPLINK IDX 308G") that associates the packet flow to a given L3 interface to which the one of uplink interfaces 13A/13B configured to support the multi-homing connection connect. This uplink interface index enables virtual router 120 to promote packet flow stickiness in which all packets corresponding to a packet flow are sent out the same L3 interface, thereby enabling load balancing per packet flow via the L3 links configured to provide the multi-homing connection.

Routing instance 122A receives an initial packet for packet flow 302A and determines whether the initial packet matches any of flow table entries 304. Packet flow 302A is a tunneled flow for a virtual network corresponding to routing instance 122A. Accordingly, the initial packet is an inner packet of a tunnel packet transported by an underlying physical network connected to an interface of NIC 106B. As the initial packet for packet flow 302A, the initial packet does not match any of flow table entries 304 and virtual router 120 processes the packet using virtual router agent 104 according to slow path 306A.

Virtual router agent 104 queries at least one of VRFs 136 and policies 138 to determine forwarding policy P1 for the packet flow 302A. Virtual router agent 104 may also identify (via a hash function) uplink index 308G for packet flow 302A. Virtual router agent 104 also installs new flow table entry 304C having matching fields 308A-308E that match packet flow 302A and policy field 308F and uplink index 308G that specifies the policy P1 and IDX1 (respectively) for packet flow 302A.

Virtual router forwarding plane 128 matches subsequent packets of packet flow 302A processed by routing instance 122A to flow table entry 304C and applies the flow actions specified policy P1 to the subsequent packets according to fast path 302B and forwards the packets flow 302A via the L3 interface identified by L3 uplink index 308G (IDX1 in this example). By virtue of L3 uplink index 308G statically associating packet flow 302A with a particular L3 uplink configured to support the multi-homing connection.

Figure 6:
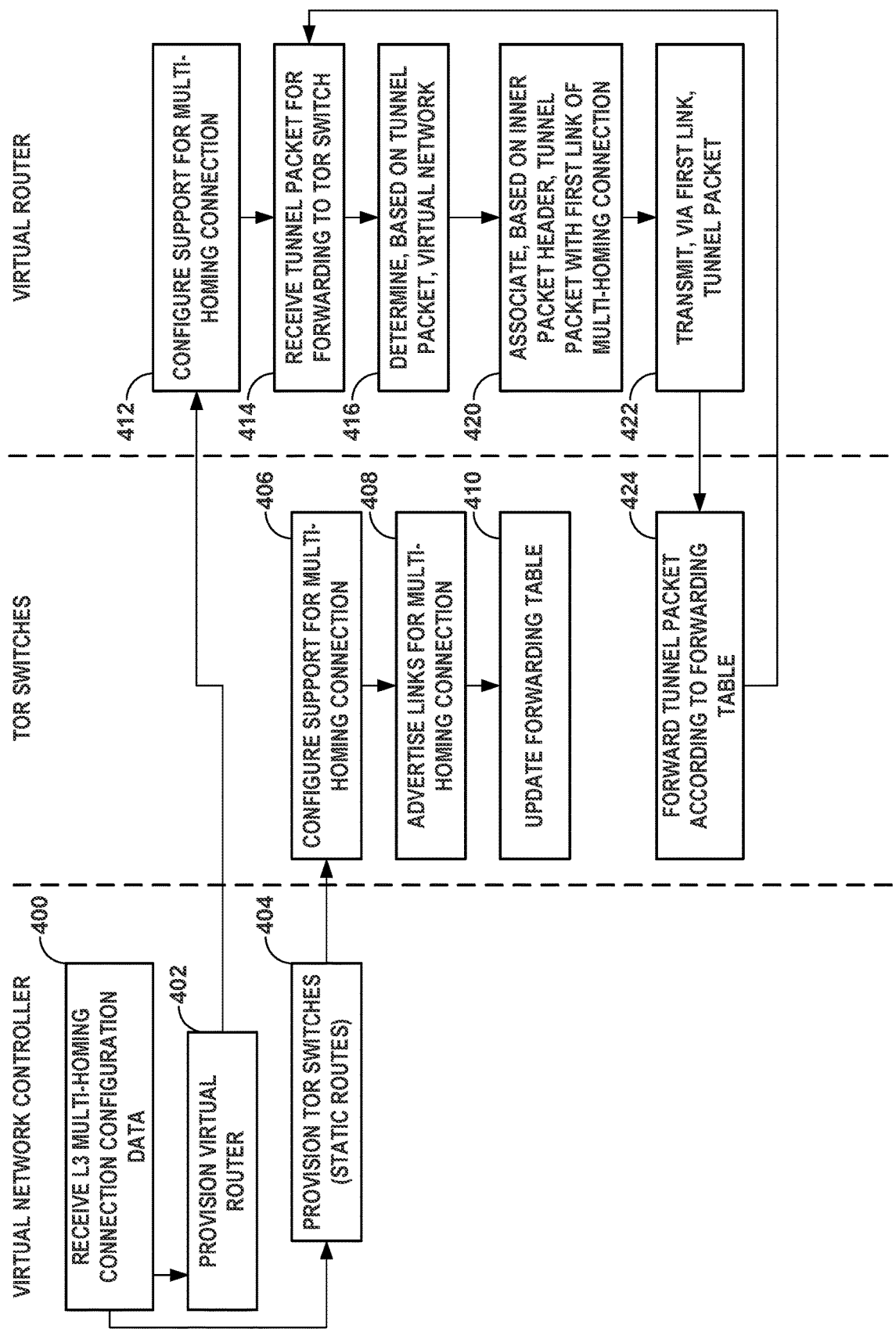
FIG. 6 is a flowchart illustrating example operation of system in performing various aspects of the L3 multi-homing connection techniques described in this disclosure.

FIG. 6 is a flowchart illustrating example operation of system in performing various aspects of the L3 multi-homing connection techniques described in this disclosure. System 10 (shown in the example of FIG. 2) may include a virtual network controller 22 configured to receive, via a user interface, configuration data (such as the above noted YAML files, such as instances.YAML) from administrator 24 that may include L3 multi-homing connection configuration data (such as the above noted parameters) (400).

Virtual network controller 22 may provision, based on the L3 multi-homing connection configuration data, virtual router (402) and TOR servers 16 (such as configuring static routes) (404), as discussed above in more detail with respect to the example of FIG. 2. Such provisioning may include virtual network controller 22 converting the YAML files into device specific configuration commands that conform to a syntax supported by potentially vendor-specific or open-source command line interfaces or other management configuration interfaces. Virtual network controller 22 may then issue the device-specific commands to provision or otherwise configure support for the multi-homing connection in both TOR switches 16 and virtual router 30A.

TOR switches 16, such as TOR switches 16A, may configure, based on the device-specific configuration commands, support for the multi-homing connection (406). Once configured, TOR switches 16 may advertise various routes between TOR servers 16 so as to enable reachability to virtual routers 30 via the multi-homing connections that may span two or more TOR servers 16 (which may be common for high availability to allow for failover between TOR switches 16). As such, TOR switches 16 may advertise links or other routing information for multi-homing connection (408). TOR switches 16 may next update forwarding tables to reflect the advertised routes from other TOR switches 16 (410), effectively establishing a switching framework via the spine and leafs that supports L3 multi-homing connectivity.

Virtual router 30A, potentially concurrent with TOR switches 16, may configure support for the multi-homing connection (412) in the manner discussed above with respect to virtual routers 30 shown in the example of FIG. 2. Once configured and communication is established via the multi-homing connection with TOR switches 16, virtual router 30A may receive a tunnel packet for forwarding to TOR switches 16 (414). Virtual router 30A may determine, based on the outer header of the tunnel packet, a virtual network 36 by which the tunnel packet is to be forwarded (416). Virtual router 30A may also determine based on the inner packet header (e.g., the five-tuple), the uplink interface index associated with the packet flow, which itself identifies a first link of the multi-homing connection (420).

After identifying the first link, virtual router 30A may transmit, via the first link, the tunnel packet to, as one example, TOR switch 16A (422). TOR switch 16A may then forward the tunnel packet according to the configured forwarding table (424). Although described with respect to a tunnel packet, various aspects of the techniques may apply to non-tunneled packets (such as control and management packets sent via XMPP), which undergo similar processing but lack any outer header, but instead are forwarded without an outer header to reach virtual network controller 22 as discussed in more detail above with respect to the example of FIG. 2.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
receiving, by a virtual router of a computing device for one or more virtual networks, a first tunnel packet comprising a first outer header and a first inner packet that defines a first packet flow;
determining, based at least on the first outer header, that the first tunnel packet is associated with a first virtual network of the one or more virtual networks;
associating, based on the first inner packet, the first tunnel packet to a first layer three link of a plurality of layer three links coupling the virtual router to two or more top-of-rack switches in the first virtual network, wherein the plurality of layer three links form a layer three multi-homing connection between the virtual router and the two or more top-of-rack switches in the first virtual network; and
transmitting, based on associating the first tunnel packet to the first layer three link, the first tunnel packet via the first layer three link of the plurality of layer three links.

2. The method of claim 1, further comprising:
receiving a second tunnel packet comprising a second outer header and a second inner packet that defines a second packet flow;
determining, based at least on the second outer header, that the second tunnel packet is associated with the first virtual network of the one or more virtual networks;
associating, based on the second inner packet, the second tunnel packet to a second layer three link of the plurality of layer three links coupling the virtual router to the two or more top-of-rack switches in the first virtual network; and
transmitting, based on associating the second tunnel packet to the second layer three link, the second tunnel packet via the second layer three link of the plurality of layer three links.

3. The method of claim 1, wherein the layer three multi-homing connection between the virtual router and the two or more top-of-rack switches comprises an active-active multi-homing connection between the virtual router and the two or more top-of-rack switches.

4. The method of claim 1, wherein associating the first tunnel packet to the first layer three link comprises applying a hash to an inner header of the first inner packet to associate the first tunnel packet with the first layer three link, wherein the inner header identifies the first packet flow as one or more of a source address, a destination address, a source port, a destination port, and a protocol.

5. The method of claim 1, wherein associating the first tunnel packet to the first layer three link comprises applying a hash to both the first outer header and an inner header of the first inner packet to associate the first tunnel packet with the first layer three link, wherein the inner header identifies the first packet flow as one or more of a source address, a destination address, a source port, a destination port, and a protocol.

6. The method of claim 1, wherein associating the first packet flow to the first layer three link comprises performing load balancing with respect to the first packet flow to associate the first packet flow with the first layer three link such that traffic loads are balanced across the plurality of layer three links.

7. The method of claim 5, wherein performing load balancing comprises performing equal cost multi-path with respect to the first packet flow to associate the first packet flow with the first layer three link.

8. The method of claim 1, wherein associating the first packet flow to the first layer three link comprises associating, by the virtual router, the first packet flow to the first layer three link without having a bonding drive configured to maintain the layer three multi-homing connection between the virtual router and the two or more top-of-rack switches.

9. The method of claim 1, further comprising configuring a first tunnel that operates via the layer three multi-homing connection such that the first tunnel packet receives a label identifying the first tunnel regardless of whether the first packet flow is associated with the first layer three link or a different layer three link of the plurality of layer three links.

10. The method of claim 1, further comprising:

receiving configuration data specifying multiple layer two links; and configuring, based on the configuration data, the layer three multi-homing connection via the multiple layer two links.

11. A network system comprising:

a switch fabric comprising a plurality of switches interconnected to form a physical network;

a virtual network controller configured to configure and manage virtual networks within the physical network; and a plurality of servers interconnected by the switch fabric, wherein each of the servers comprises an operating environment configured to execute one or more virtual machines in communication via the virtual networks, and wherein the servers comprise a set of virtual routers configured to extend the virtual networks to the virtual machines, wherein a virtual router of the set of virtual routers is configured to:

receive a first tunnel packet comprising a first outer header and a first inner packet that defines a first packet flow;

determine, based at least on the first outer header, that the first tunnel packet is associated with a first virtual network of the one or more virtual networks;

associate, based on the inner packet, the first tunnel packet to a first layer three link of a plurality of layer three links coupling the virtual router to two or more top-of-rack switches in the first virtual network, wherein the plurality of layer three links form a layer three multi-homing connection between the virtual router and the two or more top-of-rack switches in the first virtual network; and transmit the first tunnel packet via the first layer three link of the plurality of layer three links.

12. The network system of claim 11, wherein the virtual router of the set of virtual routers is further configured to:

receive a second tunnel packet comprising a second outer header and a second inner packet that defines a second packet flow;

determine, based at least on the second outer header, that the second tunnel packet is associated with the first virtual network of the one or more virtual networks;

associate, based on the second inner packet, the second tunnel packet to a second layer three link of the plurality of layer three links coupling the virtual router to the two or more top-of-rack switches in the first virtual network; and transmit, based on associating the second tunnel packet to the second layer three link, the second tunnel packet via the second layer three link of the plurality of layer three links.

13. The network system of claim 11, wherein the layer three multi-homing connection between the virtual router and the two or more top-of-rack switches comprises an active-active multi-homing connection between the virtual router and the two or more top-of-rack switches.

14. The network system of claim 11, wherein the virtual router of the set of virtual routers, to associate the first tunnel packet to the first layer three link, is configured to apply a hash to an inner header of the first inner packet to associate the first tunnel packet with the first layer three link, wherein the inner header identifies the first packet flow as one or more of a source address, a destination address, a source port, a destination port, and a protocol.

15. The network system of claim 11, wherein the virtual router of the set of virtual routers, to associate the first tunnel packet to the first layer three link, is configured to apply a hash to both the first outer header and an inner header of the first inner packet to associate the first tunnel packet with the first layer three link, wherein the inner header identifies the first packet flow as one or more of a source address, a destination address, a source port, a destination port, and a protocol.

16. The network system of claim 11, wherein the virtual router of the set of virtual routers, to associate the first tunnel packet to the first layer three link, is configured to perform load balancing with respect to the first packet flow to associate the first packet flow with the first layer three link such that traffic loads are balanced across the plurality of layer three links.

17. The network system of claim 15, wherein the virtual router of the set of virtual routers, to perform load balancing, is configured to perform equal cost multi-path with respect to the first packet flow to associate the first packet flow with the first layer three link.

18. The network system of claim 11, wherein the virtual router of the set of virtual routers, to associate the first tunnel packet to the first layer three link, is configured to associate the first packet flow to the first layer three link without having a bonding drive configured to maintain the layer three multi-homing connection between the virtual router and the two or more top-of-rack switches.

19. The network system of claim 11, wherein the virtual router of the set of virtual routers is further configured to configure a first tunnel that operates via the layer three multi-homing connection such that the first tunnel packet receives a label identifying the first tunnel regardless of whether the first packet flow is associated with the first layer three link or a different layer three link of the plurality of layer three links.

20. A non-transitory computer-readable medium comprising instructions for causing one or more programmable processors to:

receive, by a virtual router of a computing device for one or more virtual networks, a first tunnel packet comprising a first outer header and a first inner packet that defines a first packet flow;

determine, based at least on the first outer header, that the first tunnel packet is associated with a first virtual network of the one or more virtual networks;

associate, based on the inner packet, the first packet flow to a first layer three link of a plurality of layer three links coupling the virtual router to two or more top-of-rack switches in the first virtual network, wherein the plurality of layer three links form a layer three multi-homing connection between the virtual router and the two or more top-of-rack switches in the first virtual network; and transmit the first tunnel packet via the first layer three link of the plurality of layer three links.

* * * * *